United States Patent
Juric

[11] 3,888,734
[45] June 10, 1975

[54] COMPACT NUCLEAR REACTOR

[75] Inventor: Slavko I. Juric, Lynchburg, Va.

[73] Assignee: The Babcock Wilcox Company, New York, N.Y.

[22] Filed: June 15, 1971

[21] Appl. No.: 153,304

[52] U.S. Cl. .................. 176/61; 176/50; 176/59; 176/65
[51] Int. Cl. . G21c 15/22; G21c 15/24; G21c 15/18

[56] References Cited
UNITED STATES PATENTS

| | | | |
|---|---|---|---|
| 3,305,002 | 2/1967 | Leonard, Jr. et al. | 176/65 |
| 3,305,450 | 2/1967 | Maldagve | 176/65 |
| 3,322,642 | 5/1967 | Williamson | 176/65 |
| 3,383,288 | 5/1968 | Deighton | 176/65 |
| 3,384,549 | 5/1968 | Deliege et al. | 176/65 |
| 3,425,906 | 2/1969 | Weber | 176/65 |
| 3,580,807 | 5/1971 | Kumpf | 176/65 |
| 3,682,772 | 8/1972 | Bredtschneider | 176/65 |
| 3,715,270 | 2/1973 | Jackson | 176/65 |

*Primary Examiner*—Leland A. Sebastian
*Assistant Examiner*—Roger S. Gaither
*Attorney, Agent, or Firm*—J. M. Maguire, Esq.; J. P. Sinnott, Esq.

[57] ABSTRACT

A compact nuclear reactor of the pressurized-water variety having two separate parts separably engageable for ease of inspection, maintenance and repair. One of the parts being a pressure vessel having an active core and the other of said parts being a closure adapted on its lower surface with an integral steam generator and provided on its upper surface with an integral pump, external pressurizer and control rods which communicate with the active core when said separate parts are engaged to form a total unit.

2 Claims, 3 Drawing Figures

INVENTOR.
Slavko I. Juric

COMPACT NUCLEAR REACTOR

This invention relates to an improved pressurized water reactor of the compact nuclear variety with enhanced means for maintaining the optimum in efficiency of operation through ease of inspection, maintenance and repair of all of the essential components thereof without destruction of the pressure vessel.

In the pressurized-water reactors (PWR) of the art, it is extremely difficult if not impossible to inspect, maintain and repair all of the essential components thereof without the use of a complicated sequence of operations or the essential weakening, alteration or even the destruction of the pressure vessel itself which is one of the more expensive items in the power generating system.

During the life of a reactor of the nuclear variety, it is not uncommon to alter the specific pattern of flow of one or more of the individual paths of the secondary fluid in the steam generating components of the system. However, to accomplish such a task it is necessary to have access to the heat exchange unit of the apparatus otherwise known as the steam generator. In the pressurized-water reactors (PWR) of the art, this is usually accomplished by the sequential and separate removal of the internal pressurizer, control rods, and core through a rather restricted opening in the head of the vessel prior to the dismantling of the steam generator into sectional components for separate withdrawal through such portage of the pressure vessel.

In other and more extreme situations, the pressure vessel may have to be physically cut to facilitate the removal and repair of one or more of the aforesaid elements of the reactor such as an inaccessible steam generator and the like. However, the subsequent resealing of the vessel by conventional techniques into its original shape leads to a much weaker structural profile which could impair the safety of the system.

What is needed in the art is a PWR type nuclear reactor of the compact variety whose essential components may be periodically inspected in a thorough manner within a minimum span of time to insure efficiency of operation and optimization of the degree of safety inherently required of the nuclear industry.

The subject invention answers the needs of the art with special emphasis on a PWR of enhanced strength whose essential elements are of a totally integrated operative nature but which are separably engaged for separation into two major components in a one step operation for ease of inspection, replacement and repair of the essential elements thereof.

It is therefore an object of this invention to provide a structurally unique PWR whose essential components are of an interlocking nature promoting ease of inspection, maintenance, repair, and use under a wide variety of service conditions.

Another object of this invention is to provide a PWR of enhanced strength having a potentially longer life and lower overall cost due to ease of fabrication and maintenance during periods of use and repair.

A further object of this invention is a PWR of a compact nature provided with a primary coolant having a flow path reversably responsive in direction to inherent conditions of the vessel.

Other objects and many of the attendant advantages of this invention will become apparent to one skilled in the art upon a reading of the following detailed specification when taken with the accompanying drawings wherein.

Similar numerals refer to similar parts throughout the several views.

In the broad sense, the subject invention is a compact nuclear reactor of the pressurized-water variety having a contained cylindrical pressure vessel provided with an annular opening coextensive with the inner diameter of the body of such vessel, the opening provided with a separably engageable closure being integrally provided with both a close-coupled external pressurizer and a plurality of separably engagable steam generator sections each of which having a port adapted with a pump externally oriented in an integral fashion in the vertical plane relative to such closure, such pump having a shaft provided with an impeller communicating with said port and such steam generators positioned in spaced relation around the periphery of a core of nuclear fuel whose control rods are of limited length and operatively pass through such closure.

Figure 1:
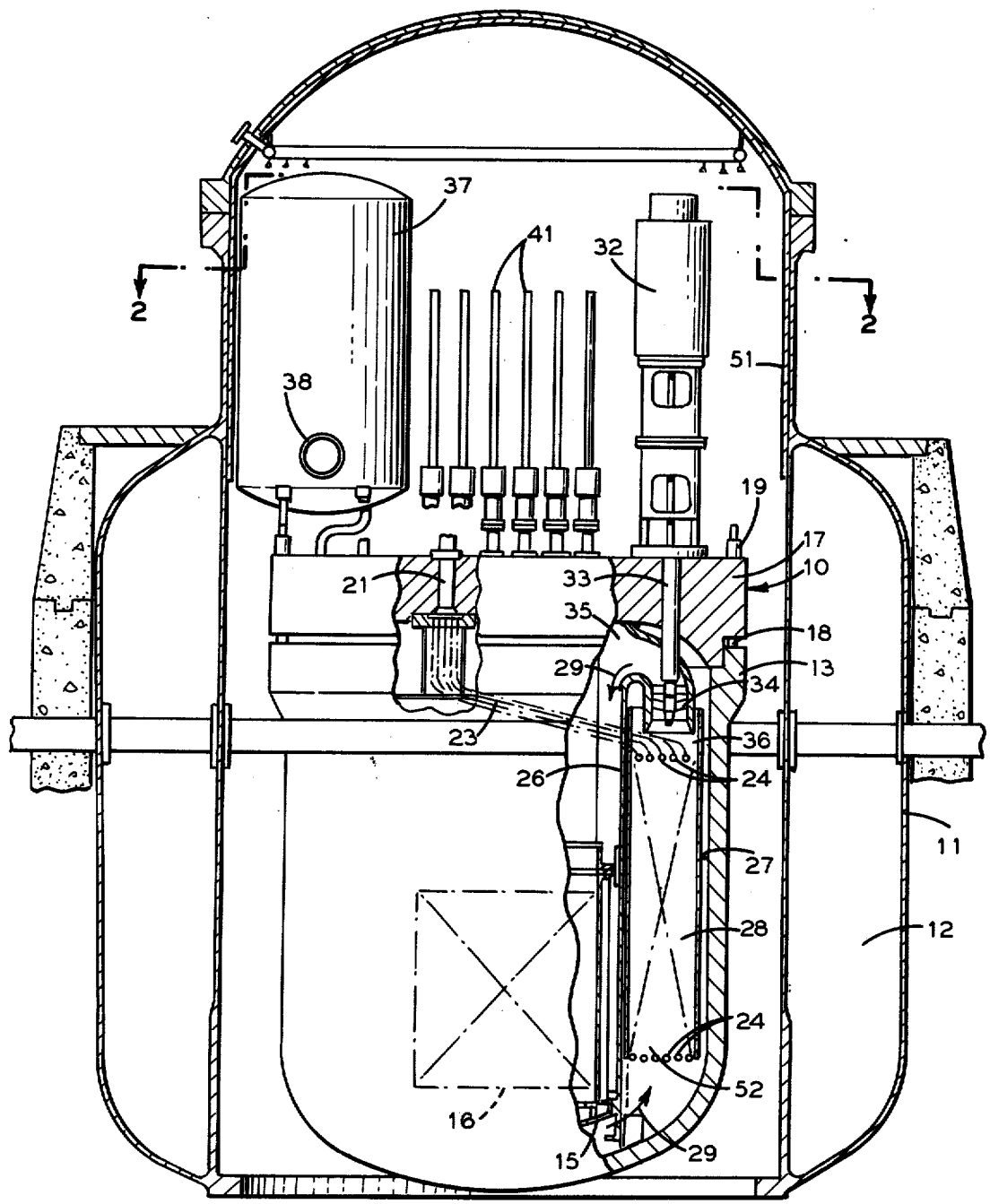
FIG. 1 is a side view in section of the compact PWR of this invention.
Figure 2:
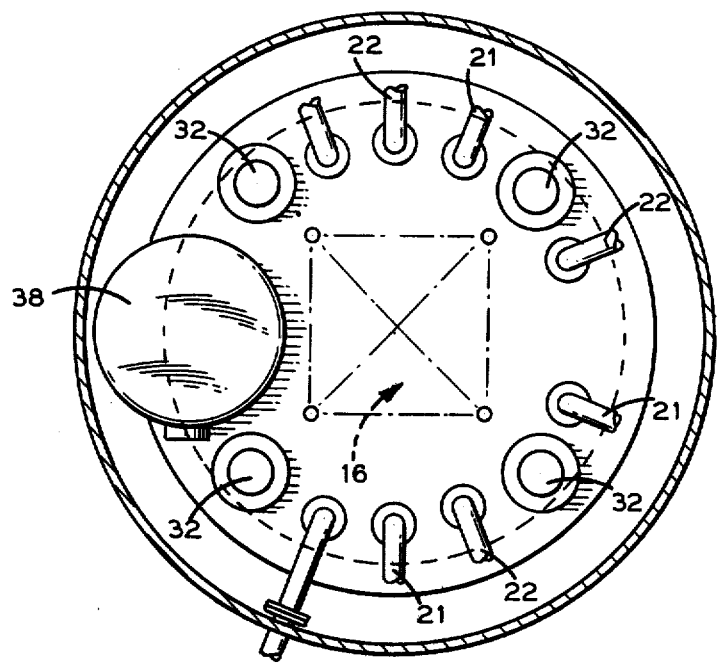
FIG. 2 is a top plan view of the reactor of FIG. 1.

More specifically, as shown in FIG. 1, a pressure vessel 10 is operatively positioned within a containment vessel 11 having a number of vapor suppression compartments 12. The pressure vessel 10 is basically cylindrical in shape having an upper end 13 of relatively wide open annular construction provided with an engagement area in the form of a flange 14. The pressure vessel 10, as shown, has an area of support 15 therein for an active core 16 of nuclear fuel and spacial provision for a supply of pressurized water.

A cylindrical closure 17 separably engages the mouth of the pressure vessel through a mating flange 18 and is retained therein by securing means 19. The closure 17 is integrally provided with a plurality of inlet headers 21 and outlet headers 22 each of which integrally communicate with a tube bundle 23 composed of individual tubes 24 coiled helically within said cylindrical pressure vessel 10 for the full extent of their individual length between the inlet 21 and outlet headers 22. These forms effect the foundation of a steam generator for the reception of secondary coolant.

A vertically disposed shroud 26 encircles the core 16 and combines with the inner surface 27 of the pressure vessel 10 to form an annular space 28 for the flow of primary fluid 29 over the helically coiled tubing 24 for the production of steam from the fluid flowing therein.

The closure 17 is also integrally provided with a vertically oriented external pump 32 having a relatively thin shaft 33 adapted with a variable drive impeller 34, the latter occupying the annular flow area 35 provided at the cold leg of the steam generator. Due to the fact that the shaft 33 is relatively thin, improved strength is maintained at this point of stress in the closure 17. At least one external pressurizer 37 is also provided in the upper surface of the closure 17 which communicates with the interior of the pressure vessel 10 through various connections (not shown) to maintain the pressure and liquid inventory in such vessel during operation. Such pressurizers 37 usually employ heaters 38 and either or both foreign gas and spray for liquid control.

It is further provided, as shown, that the control rods 41 operatively and directly communicate with the active core 16 by penetration of the closure 17 itself. In this manner, the tendency is towards closer tolerance control of the rod itself because of the relatively short length of the rod inherently required leading to a greater degree of safety and control of the fuel rods (not shown) of the active core 16.

In general, the aforesaid pressure vessel 10, pressurizer 37, pump drives 32 and control rods 41 are encompassed by an inner containment chamber 51 otherwise known as a dry well. Also, for some applications, it may be desirable to enclose a major portion of the reactor itself with a conventional wet well for use in the suppression of vapor. Usually, the body of water contained in such compartments 12 or wells is at a level above the core to also provide biological shielding of a substantial nature.

In essence for periodic inspection which is essential for the efficiency and required safety of the reactor, the pressure vessel 10 may be separated for inspection by a one step process. The closure 17 may be simply removed from the vessel 13 by the release of engagement means 19 and the vertical lifting of the closure from such vessel. In effect this will remove the steam generator, pumps, control rods and pressurizer as one integral unit from their interrelated position relative to the active core. In this manner, the steam generator may be inspected and repaired, if necessary, for efficiency of further operation. Further, physical degradation, if any, of the impeller due to wear may easily become apparent and replacement thereof accomplished in an easy and efficient manner.

Also, if desired the pressurizer and control rods may be replaced and all of the aforesaid operations relative to the essential components of the reactor may be carried out within a minimum of shutdown time in an efficient manner.

After inspection of the separably engaged unit, attention may be directed to replacement of the core of active fuel and the primary coolant. Also, of greater importance is that the entire interior, even hitherto inaccessible areas thereof, of the vessel may be entirely and efficiently inspected for most types of degradation due to exposure to irradiation, such as embrittlement, insuring the long term control and safety of the vessel as a generator of power.

The arrangement of the aforedescribed apparatus with its inherent ease of separation into the essential components thereof in a safe, efficient and timely manner has been made possible by recent advances in metallurgy. Alloys are presently available which make possible the utilization of lighter weight and thinner parts having an optimum in strengths and resistance to long term irradiation from nuclear sources. As a result, it is quite possible to use conventional lifting equipment for a task which heretofore was considered impossible and impractical.

Figure 3:
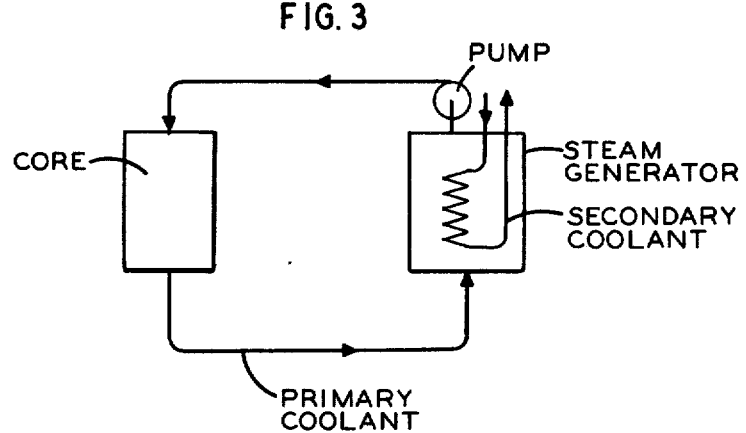
FIG. 3 is a flow diagram of the primary coolant of the subject invention.

Further, as shown in FIG. 3, in the operation of the aforedescribed nuclear reactor of the PWR compact variety, the flow of primary coolant is of the forced circulation type but in a direction opposed to the natural circulation inherent in the conventional PWR type reactors of the art. In this manner, the force of the pump is always operating at the optimum in efficiency because of the minimization of the power requirement of the pump. This also reduces the size of the pump required and indirectly the cost because the size of the pump is directly related thereto.

Referring back to FIG. 1, as the primary coolant leaves the pump-driven impeller 34 in a flow path which directly passes from the annular flow area 35 of the steam generator onto and through the core 16 from top to bottom it is heated but maintained in the liquid phase by a pressure of about 2200 psi. In this instance, the temperature of the upper end of the core is usually 565°F while the temperature of the lower end of the core is about 600°F. It is then directed by baffles (not shown) to the lower end of the steam generator 52 for its upward travel over the helically wound tubing 24 for the conventional exchange of heat to the secondary coolant in tubes 24. For the optimum in efficiency of the exchange, the flow of the major portion of the secondary coolant is transverse the flow of the primary coolant through the steam generator. After such passage, the cooled primary fluid again is forced out of the annular flow area 35 for a return to its original path through the core. In this manner, the cooling margin of the core is increased for the inherent safety of the core and the avoidance of accidental overheating and burnout of the same during the aforedescribed flow operation.

As a supplemental advantage, if all the pumps 32 fail, the flow of the primary coolant will reverse itself and natural circulation will take place insuring the safety of the reactor. As an added advantage, minimum penetration of the vessel may be insured for enhancement of the strength thereof and minimization of fabrication cost due to the design of the described reactor having an assembly of two interpositionally related individual units or subassemblies. Further, the design of the aforedescribed compact reactor fully and easily satisfies the safety criteria of the United States Government which must be complied up relative to periodic inspection of the essential components of the reactor for the life of the latter unit. This requirement is met with latitude in the basic design of the reactor for a sizeable core of varying design accompanied with latitude in primary coolant inventory requirement.

What is claimed is:

1. A pressurized water reactor having a reactor core with a coolant flowpath that has a natural upward circulation direction and a structure for pressurized water flow therethrough, comprising a pressure vessel having a longitudinal axis for containing the pressurized water and promoting the flow of the pressurized water therewithin, said pressure vessel having a generally cylindrical shape that is open on one end, said open end being transverse to said longitudinal axis of said pressure vessel, a closure separably engaged to said pressure vessel and fitting over said pressure vessel opening, a longitudinally disposed shroud positioned in said pressure vessel forming an annular space with said pressure vessel for the pressurized water to flow upwardly through said annular space selectively in a forced flow direction that is opposite to a downward natural circulation longitudinal direction in said annular space, a bank of vapor generating tubes disposed in said annular flow space, said tubes having inlet and outlet openings, a plurality of inlet headers secured to said closure and in communication with said tube inlet openings and a plurality of outlet headers secured to said closure and which communicate with said tube outlet openings, a plurality of control rods operatively passing through said closure, at least one external pressurizer engaged to said closure and communicating with the interior of said pressure vessel through said closure to maintain the pressurized water in the liquid phase, and a plurality of pumps secured to said closure and each having a shaft passing through said closure, each of said shafts provided with an impeller positioned in said annular flow space beneath said closure for producing said forced flow upwardly over said vapor generating tubes and downwardly through said core, wherein said pressurized water flows through said annular space in the downward flow longitudinal direction and through the core in an upward natural circulation longitudinal direction for protection and safety upon failure of said pumps, and whereby separation of said closure from said pressure vessel for inspection, maintenance and repair will remove said inlet and outlet headers, said control rods, said pressurizer and said plurality of pumps from said pressure vessel.

2. The nuclear reactor of claim 1 wherein said vapor generating tubes are helically coiled in order to enable the pressurized water to flow in a direction that is generally transverse to said tubes.

* * * * *